United States Patent

Liu

[11] Patent Number: 6,137,824
[45] Date of Patent: Oct. 24, 2000

[54] METHOD FOR ESTIMATING SIGNAL AND NOISE QUALITY, AND A RECEIVER

[75] Inventor: Qin Liu, Tampere, Finland

[73] Assignee: Nokia Telecommunications OY, Espoo, Finland

[21] Appl. No.: 08/913,068

[22] PCT Filed: Dec. 27, 1996

[86] PCT No.: PCT/FI96/00700

§ 371 Date: Nov. 24, 1997

§ 102(e) Date: Nov. 24, 1997

[87] PCT Pub. No.: WO97/24816

PCT Pub. Date: Jul. 10, 1997

[30] Foreign Application Priority Data

Dec. 29, 1995 [FI] Finland .................................. 956359

[51] Int. Cl.[7] .................................................. H04B 15/00
[52] U.S. Cl. ........................ 375/130; 375/133; 375/147; 375/149; 375/136
[58] Field of Search .................................. 370/335, 342; 375/149, 136, 133, 147, 230, 130

[56] References Cited

U.S. PATENT DOCUMENTS

| 5,325,394 | 6/1994 | Bruckert .................................. 375/200 |
| 5,440,597 | 8/1995 | Chung et al. ........................... 375/149 |
| 5,684,793 | 11/1997 | Kiema et al. .......................... 370/335 |
| 5,768,307 | 6/1998 | Schramm et al. ....................... 375/208 |
| 5,881,099 | 3/1999 | Takahashi et al. ...................... 375/206 |

FOREIGN PATENT DOCUMENTS

95/08876  3/1995  WIPO.

OTHER PUBLICATIONS

William C.Y. Lee, "Combining Technology", Mobile Communications Engineering, Chapter 10, pp. 291–336.

Hagenauer et al., "A Viterbi Algorithm With Soft–Decision Outputs and its Applications", IEEE Globecom, Nov. 1989, pp. 1680–1686.

*Primary Examiner*—Stephen Chin
*Assistant Examiner*—Shuwang Liu
*Attorney, Agent, or Firm*—IP Group of Pillsbury Madison & Sutro, LLP

[57] ABSTRACT

The invention relates to calculating an estimate representing noise and signal quality, and to a receiver of a radio system. The highest value of a correlation vector is compared either to the second highest value or to the mean value of the other values. If a specific spreading code is used in the reception of the signal, the comparison forms a ratio of the signal and disturbance, the ratio being applicable particularly to combining signals from the diversity branches of a diversity receiver, whereby the method makes it possible to combine the signals even prior to detection. If the reception employs a spreading code with which no signal received by the receiver has been transmitted, it is possible by comparing the correlation values to form a noise quality estimate, an estimate value higher of which meaning that the receiver is receiving a signal and not just noise.

23 Claims, 2 Drawing Sheets

METHOD FOR ESTIMATING SIGNAL AND NOISE QUALITY, AND A RECEIVER

This application is the national phase of international application PCT/FI96/00700, filed Dec. 27, 1996 which was designated the U.S.

FIELD OF THE INVENTION

The present invention relates to a method for estimating signal quality, the method being used in a spread spectrum radio system having several transmitters and receivers, and in which each transmitted signal is pseudonoise-coded by a separate spreading code into a wideband form and the signal being converted into modulation symbols having a vector form, said modulation symbols being submatrices of a substantially orthogonal known transform matrix, said submatrices being chosen on the basis of a combination of bits to be transmitted, the signal being multiplied by a spreading code in the receiver in which a correlation is formed between the received modulation symbols and the known transform matrix, the correlation forming correlation vectors which comprise correlation values and by means of which the signal is detected.

The invention further relates to a method for estimating the quality of noise, the method being used in a spread spectrum radio system having several transmitters and receivers, and in which each transmitted signal is pseudonoise-coded by a separate spreading code into a wideband signal and the signal being converted into modulation symbols having a vector form, said modulation symbols being submatrices of a substantially orthogonal known transform matrix, said submatrices being chosen on the basis of a combination of bits to be transmitted, the signal being multiplied by a spreading code in the receiver in which a correlation is formed between the received modulation symbols and the known transform matrix, the correlation forming correlation vectors which comprise correlation values and by means of which the signal is detected.

The invention additionally relates to a receiver of a spread spectrum radio system, the system comprising several transmitters and receivers, each transmitted signal in the system being pseudonoise-coded by a separate spreading code into a wideband signal and the signal being converted into modulation symbols having a vector form, said modulation symbols being submatrices of a substantially orthogonal known transform matrix, said submatrices being chosen on the basis of a combination of bits to be transmitted, the signal being multiplied by a spreading code in the receiver which comprises a correlator for forming a correlation between the received modulation symbols and the known transform matrix, the correlation forming correlation vectors which comprise correlation values and by means of which the signal is detected.

BACKGROUND OF THE INVENTION

In a spread spectrum radio system, and particularly in a CDMA technique, the narrowband data signal of the user is modulated by a spreading code of much wider bandwidth to a relatively wide band. In the known experimental systems, the bandwidths used include, for example, 1.25 MHz, 10 MHz and 50 MHz. The spreading code usually consists of a long pseudo-random sequence of bits. The bit rate of the spreading code is much higher than that of the data signal, and to make a distinction between data bits and symbols, the bits of the spreading code are referred to as chips. Each data symbol of a user is multiplied by all the spreading code chips. Consequently, the narrowband data signal spreads to the frequency band used by the spreading code. The signal of each user has a separate spreading code. Several users transmit their signals simultaneously by using the same frequency band, and the signals from the users can be identified from one another in the receivers on the basis of the pseudo-random spreading code.

Regardless of the efficient interference and fading protection based on spread spectrum technology, the connection quality, affected by the signal and noise quality, between a base station and a mobile station in the radio system constantly varies. The variation results from disturbance present on the radio path and the attenuation of radio waves as a function of distance and time in the channel fading out. The connection quality can be measured for example by monitoring the strength level received. In order to partly compensate for the quality variations of the connection, power control can be used.

A digital radio system utilizing a multilevel orthogonal modulation such as a Walsh-Hadamard transform requires a more accurate method than power measurement in order to estimate the connection quality. In addition, it is often important to know whether the receiver is picking up a signal or just noise as it is not worthwhile to apply noise to the detector of the receiver. Nevertheless, the amplitude variation of the noise is a useful piece of information. The known parameters for quality of the connection include Bit Error Rate (BER) and signal to noise ratio (SNR).

It is known to utilize the decisions of Viterbi detection in estimating the SNR of the received signal. Due to the Viterbi algorithm often being too demanding a task for a digital signal processing program, separate Viterbi hardware has to be used. This is described in greater detail in J. Hagenauer, P. Hoeher: A Viterbi Algorithm with Soft-decision Outputs and its Applications, IEEE GLOBECOM 1989, Dallas, Tex., November 1989, which is herein incorporated as reference.

As known, the SNR information is needed when using different kinds of diversity receivers in which a signal received from different diversity branches is combined. For example, a diversity receiver of the RAKE principle has a multitude of reception branches each of which is capable of synchronizing into a different signal component of the diversity signal. The receiver is therefore capable of receiving several signals simultaneously. Particularly the CDMA system utilizes RAKE receivers.

In diversity reception, the most typical diversity receivers combine the signals prior to or following the detection, and they comprise for example Selective combining, Maximal-ratio combining, and Equal-gain combining. The diversity signals are normally detected by using the Viterbi detection, whereby the signal combining takes place after the detection because the Viterbi detection produces the SNR estimate required. However, the most advantageous way is to combine the signals prior to the detection because this results in a higher signal gain. However, a diversity branch receiving no signal is not to be used in the combining. This makes the correct allocation of RAKE branches important. A closer description on diversity receivers is given for example in William C. Y. Lee: Mobile Communications Engineering, Chapter 10, Combining Technology, pp. 291–336, McGraw-Hill, USA, 1982, which is incorporated herein as reference.

CHARACTERISTICS OF THE INVENTION

The present invention aims at realizing a method by means of which the SNR can be estimated directly from the signal received without employing the burdensome Viterbi detection for this purpose. A further aim is to enable signal combining in the diversity receivers prior to detection. In addition, an object of the method according to the invention is to facilitate RAKE allocation in the diversity receiver.

These objects are achieved by a method of the type set forth in the introduction for estimating signal quality, which is characterized in that when multiplying the received signal by a specific spreading code, the estimate representing the signal quality is formed by comparing the mean value of one or more correlation values of the correlation vector to the highest value of the correlation vector, in which the mean value of one or more correlation values comprises all but the highest correlation value.

The method of the type set forth in the introduction for estimating noise quality is characterized in that when multiplying the received signal by a spreading code which is substantially orthogonal to the spreading codes of all the received signals, the estimate representing the noise quality is formed by comparing the mean value of one or more correlation values of the correlation vector to the highest value of the correlation vector, in which the mean value of one or more correlation values comprises all but the highest correlation value.

The receiver according to the invention, in turn, is characterized by comprising a comparison means for forming an estimate representing the signal quality, the comparison means being arranged to compare the mean value of one or more correlation values of a single correlation vector, with the exception of the highest value thereof, to the highest value of the correlation vector, and arranged to operate when multiplying the signal by a specific spreading code.

The receiver of the invention is further characterized by comprising a comparison means for forming an estimate representing noise quality, the comparison means being arranged to compare the mean value of one or more correlation values of a single correlation vector, with the exception of the highest value thereof, to the highest value of the correlation vector, and arranged to operate when multiplying the signal by a spreading code substantially orthogonal to the spreading codes of all the received signals.

The method of the invention provides significant advantages. By avoiding the use of the Viterbi algorithm for estimating the signal to noise ratio, memory capacity and time taken up by the calculation process will be saved. The SNR value obtained from the estimate may be utilized in evaluating the state of the channel, as an aid in bad frame estimating methods and in ML (maximum likelihood) metrics scaling. The estimate may also be employed in enhancing the decoding of a Soft Decision. In addition, the SNR may be utilized in diversity combining e.g. in RAKE receivers, and it is particularly practicable in case the combining of the diversity signals takes place prior to detection. By means of the invention, it is also possible to deduct when a receiver or its branch is receiving a signal and not just noise-caused disturbance fluctuating like a signal. This enables RAKE allocation.

The preferred embodiments of the methods according to the invention are also set forth in the attached dependent claims and the preferred embodiments of the receivers according to the invention are set forth in the attached receiver-related dependent claims.

DESCRIPTION OF THE DRAWINGS

In the following, the invention will be described in greater detail with reference to the attached drawings, in which.

DESCRIPTION OF THE PREFERRED EMBODIMENTS

Figure 1:
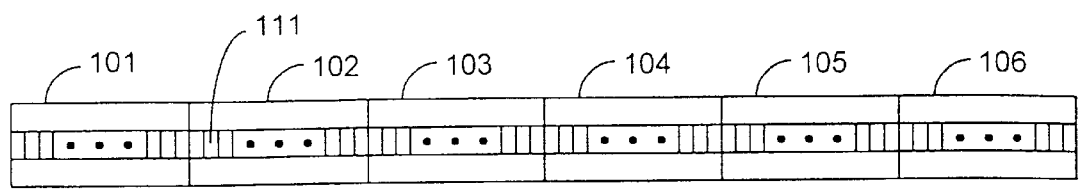
FIG. 1 illustrates a CDMA time-slot and correlation vectors.

At first, an overview will be taken to the theoretical background of the invention. In a cellular radio system, a base station receiver should form information on the signal power level and quality in order to be capable of efficient signal weighting in diversity combining, closed-loop power control, etc. At the earliest stage of processing a received signal, the Walsh-Hadamard transform includes information on signal quality of undistorted information, i.e. on a sort of signal to noise ratio. Therefore, an estimate representing signal quality can be formed at the initial stage of signal processing, and this information can be conveyed into latter stages of signal processing, such as Viterbi detection and diversity combining. The general principle of calculating an estimate representing signal quality comprises comparing the highest correlation value to some other correlation value(s). Consequently, the highest correlation value relates to the information transmitted and the other correlation values to noise and other signal distortions.

Without losing generality of the description, a case is here considered with one sample per chip, i.e. spreading code bit, and a static (Gaussian) channel. The binary signal is first convolutional coded, then 6 encoded bits define a Walsh symbol, i.e. the most common modulation symbol. With pseudo-noise spreading of factor 4, each Walsh chip results 4 pseudo-noise chips for I branch and 4 pseudo-noise chips for Q branch. At the reception, the pseudo-noise is released by despreading the signal and then the Walsh-Hadamard inverse transform takes place.

Let us assume that the Walsh chip before pseudo-noise is $S_{ki}$, with k representing kth Walsh symbol and i representing ith chip. After the Walsh-Hadamard transform, the amplitude of the chip is $$amp = \sqrt{\left[\left[\sum_{i=1}^{64}(2S_{ki}+N_1)S_{ji}\right]^2 + \left[\sum_{i=1}^{64}N_2 S_{ji}\right]^2\right]}, \quad (1)$$

where $N_1$ is the noise created by $PN^I \times n_I$ and $PN^Q \times n_Q$, $PN^I$ is the spreading code for the I branch and $PN^Q$ is the spreading code for the Q branch, $n_I$ and $n_Q$ are independent Gaussian noise in the I and Q branches. $N_2$ is the noise created by $PN^I \times n_Q$ and $PN^Q \times n_I$. The assumption here is that the Walsh symbols contain 64 Walsh chips, but in a general case the Walsh symbol may also be longer. It can be verified that $N_1$ and $N_2$ are Gaussian distributed with zero mean and variance equal to half of the channel noise variance ($\delta^2$) When j≠k, i.e. when comparing two different Hadamard matrix submatrices i.e. rows i.e. Walsh symbols with each other, this typically takes place at the reception, whereby $$\sum_{i=1}^{64} S_{ki} \cdot S_{ji} = 0$$

will be obtained due to the rows being orthogonal, and the expectation value E(amp) will be $$E(amp) = E\left(\sqrt{[N_{11}^2 + N_{22}^2]}\right), \quad (2)$$

where $N_{11}$ and $N_{22}$ are Gaussian distributed with zero mean and variance equal to $64\delta^2/2$. Since $N_{11}$ and $N_{22}$ are not independent and the square root is a nonlinear operation, the expectation value E(amp) may not equal $$\sqrt{[64\delta^2]}.$$

With a computer simulation, it can be verified that equation (2) is expressed as $$E(amp) = \sqrt{[64\alpha\delta^2]}, \quad (3)$$

where α is approximately 0,78 in the CDMA system. Therefore, the noise variance, i.e. the effective value $\delta^2$ is $$\delta^2 = \frac{1}{64\alpha} E^2(amp), \quad (4)$$

With j=k, i.e. in computing the correlation of the Hadamard matrix row with itself, the analysis is the same but the result is $$E(amp) = \sqrt{[128^2 + 64\alpha\delta^2]}, \quad (5)$$

This is the largest amplitude, and in the reception this result is associated with the information transmitted. In this manner, it may be verified that the noise variance i.e. the effective value, and the effective value of the signal can be formed by means of correlation vectors formed by a Walsh-Hadamard transformer, and these results can be used in forming an estimate representing the quality of the signal. A similar result will be arrived at when using, in place of the Walsh-Hadamard transformation, any transform matrix whose submatrices are substantially orthogonal.

In the following, the invention will be described by means of the CDMA technique. In the exemplary CDMA cellular radio system, transmission takes place in TDMA frames consisting of 16 time-slots. Typically, each time-slot comprises six modulation symbols. The modulation symbols are generally transformation matrix submatrices relating to channel coding. When transmission employs Walsh-Hadamard transform, a time-slot typically contains six vector-form modulation symbols each of which comprises 64 Walsh chips. In the transmitter of the CDMA system, the modulation symbols are formed as in prior art by transforming the bits to be transmitted in 6-bit groups into numbers between 0 and 63, each being used to assign one row of the 64 rows in the Hadamard matrix. As the Hadamard matrix, one of the numerous orthogonal transform matrices, is a matrix comprising 64×64 Walsh chips, each row i.e. modulation symbol to be transmitted has 64 Walsh chips. The modulation symbols are transformed in the receiver into correlation vectors by means of which the information received is further detected.

FIG. 1 shows correlation vectors 101–106 corresponding to modulation symbols comprised in a time-slot, the vectors having correlation values 111, The correlation vector 101–106 is formed in the receiver so that a Hadamard matrix row i.e. a modulation symbol is multiplied in the receiver by the Hadamard matrix. This is represented as a mathematical formulation in formula (6)

$$\begin{bmatrix} m1 \\ m2 \\ m3 \\ \vdots \\ m64 \end{bmatrix}^T \times \begin{bmatrix} H(1,1) & H(1,2) & H(1,3) & \ldots & H(1,64) \\ H(2,1) & H(2,2) & H(2,3) & \ldots & H(2,64) \\ H(3,1) & H(3,1) & H(3,3) & \ldots & H(3,64) \\ \vdots & \vdots & \vdots & \ddots & \vdots \\ H(64,1) & H(64,2) & H(64,3) & \ldots & H(64,64) \end{bmatrix} = \begin{bmatrix} C1 \\ C2 \\ C3 \\ \vdots \\ C64 \end{bmatrix}^T, \quad (6)$$

where the chips m1, m2, m3, . . . , m64 are chips of a modulation symbol, the matrix consisting of H(x,y) chips is a transform matrix, and a correlation vector is formed as a product of these, consisting of correlation values C1, . . . , C64 (values 111 in FIG. 1). The chips of the modulation symbols are advantageously Walsh chips and the transform matrix is advantageously a Hadamard matrix, whereby the number of correlation values 111 of the modulation symbol and the correlation vector 106–111 is advantageously 64. The multiplying corresponds to the correlation between the Hadamard matrix and the modulation symbol, whereby the position i.e. index of the maximum value in the correlation vector 101–106 corresponds to the value of the six bits transmitted. It is equivalent to the multiplying process to form correlation between the modulation symbol and a vector corresponding to a row in the Hadamard matrix separately.

Figure 2:
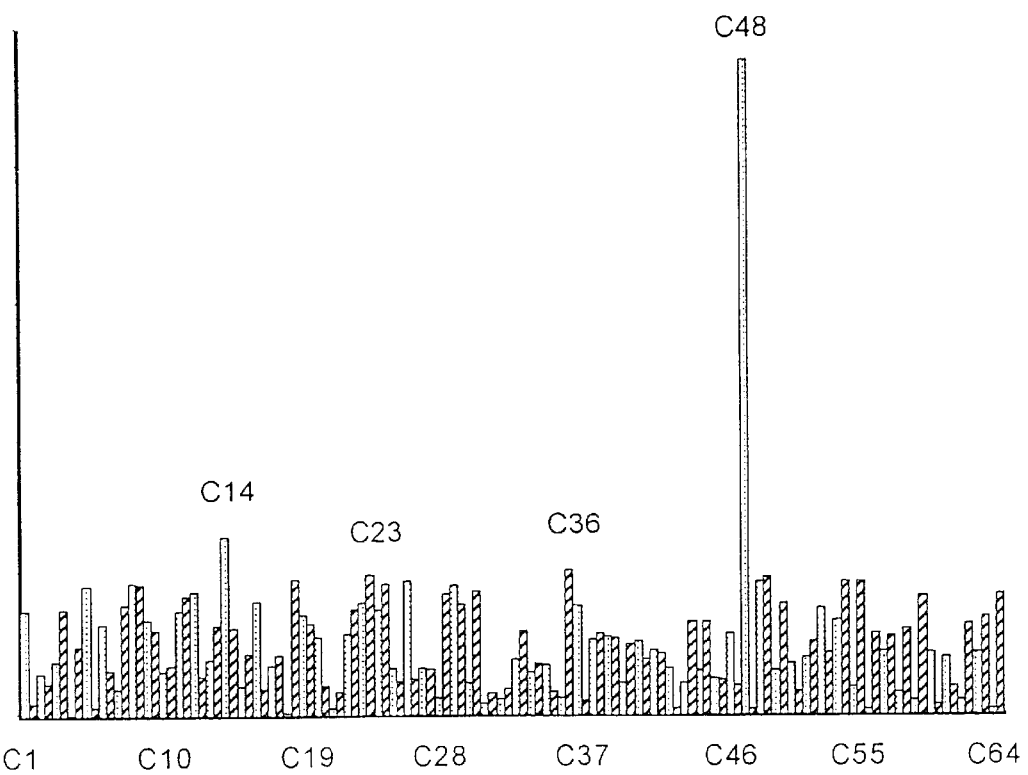
FIG. 2 is an example of distribution of correlation values of a correlation vector.

FIG. 2 illustrates in closer detail the distribution of correlation values 111 of two correlation vectors 101–106. The distributions are intended to illustrate the invention, and therefore the values and distributions do not represent a measurement result but an operational example. The bars with horizontal lines illustrate a situation in which the received signal has been multiplied by a spreading code with which no signal within the reception area of the receiver has been transmitted. The sequence and/or phase of the spreading code bits is one having no transmission. In such a case, the signal is not detected and the correlation vector is filled by correlation values that represent noise.

The dotted bars represent a situation where the transmitting party has sent a signal, and at reception the wideband signal has been multiplied by a specific spreading code into a narrowband signal. After the Walsh-Hadamard transform, the highest index of the correlation value determines the information transmitted. As the Hadamard matrix employed as the transform matrix comprises independent i.e. orthogonal submatrices, which are the matrix rows i.e. vectors, the correlation between the modulation symbol and the Hadamard matrix obtains low and random values always when the modulation symbol does not relate to the information transmitted. Such correlation values are represented by C1–C47 and C49–C64. However, the correlation value is high when the modulation symbol is associated with the information transmitted. The highest value in FIG. 2 is C48 i.e. the 48th correlation value. By converting the number 48 into binary form, the fact that the 48th correlation value is the highest allows the deduction to be made that the six-bit combination transmitted was 110000.

Estimating signal quality

In the following, the method according to the invention for estimating signal quality will be dealt with in greater detail by means of FIGS. 1 and 2. The wideband signal is multiplied by a separate spreading code in the receiver, whereby its pseudo-random noise i.e. pseudonoise coding will be lost and it will become a narrowband signal. The signal will be converted further, advantageously by the Walsh-Hadamard transform, which produces the correlation vectors. In the method according to the invention, the estimate representing the signal quality is formed by comparing one or more correlation values of a single correlation vector 101–106, with the exception of the highest value thereof, to the highest value of the correlation vectors 101–106 and advantageously by averaging the comparison result of each single correlation vectors 101–106 in relation to the number of correlation vectors employed in the comparison. In FIG. 2, the highest correlation value of the dotted correlation vector is C48 which is with the highest probability related to the information transmitted. The other values C1–C47 and C49–C64 of the dotted correlation vector represent noise and unorthogonality. When comparing to one another the correlation values which are thus formed and which relating to noise and the signal/information, an estimate closely relating to the SNR will be obtained. Regarding a single correlation vector 101–106, the other values C1–C47 and C49–C64, i.e. all but the highest, may be combined e.g. by summing or by calculating the mean value which is compared to the highest value C48 when forming the estimate. A second alternative is to choose a single value which is compared to the highest value. Rapid fluctuations of the estimate may be reduced and the result be made more accurate by taking into account estimation results of several correlation vectors and by calculating an estimate from the results as a mean value.

The highest correlation value of the correlation vectors 101–106 may advantageously be compared to the second highest correlation value of the same correlation vector. In FIG. 2, the second highest correlation value is C14. As the second highest correlation value C14 represents the heaviest interference in the transmission, an estimate representing the worst possible SNR may be obtained by comparing the highest correlation value to the second highest correlation value, said estimate representing signal quality. Comparing the second highest correlation value to the highest correlation value advantageously takes place by dividing said values by each other, whereby the dividing produces an estimate representing the signal quality. In a second preferred embodiment of the invention, the comparison takes place by calculating the difference between the highest and the second highest correlation value, the difference also representing an estimate for the signal quality. A mean value for the estimate for a specific time interval or at a specific number of correlation vectors is more advantageous than a signal quality estimate relating to one correlation vector. For this reason, it is advantageous to average the forming of the estimate as a difference and division result between the highest and the second highest correlation value to be in one time-slot.

According to the preferred embodiment of the invention, the correlation-vector-specific estimate representing signal quality is formed by dividing the highest correlation value C48 of the correlation vector 101–106 by the mean value of all the correlation values C1–C47 and C49–C64 but the highest correlation value. A second alternative is to calculate the difference between the highest correlation value and the mean value of all but the highest correlation value. In averaging the correlation values, all but the highest correlation value are advantageously taken into account. Instead of the mean value, a median or some other linear or non-linear function may be used which weights the result to be between the highest and lowest value used in the calculation.

In case signal transmission takes place in a cellular radio system in time-slots of the CDMA technique, all correlation vectors 101–106 comprised by the time-slots are advantageously used. The exemplary time-slot of the cellular radio system comprises six modulation symbols which form six correlation vectors per a time-slot. Consequently, in CDMA technique, the estimate representing signal quality in accordance with the invention is formed by averaging from six correlation-vector-specific estimates an estimate representing signal quality over the entire time-slot. In this case, too, averaging may be replaced by a median or some other averaging function.

It is advantageous to use an estimate in a diversity receiver, such as a RAKE receiver, as a weighting coefficient of the diversity branches, which enables combining of diversity signals even prior to detection. On the basis of the estimate, a signal from the branch having the best quality may be selected for detection. Whenever an estimate is formed, e.g. time-slot by time-slot, the signal from the best branch is selected for detection and therefore signals from all the branches have a chance to be selected for detection. When combining signals form different diversity branches, the sum signal which is to be detected may be formed by combining estimate-weighted signals of the different branches. In this manner, the most probable signal can be detected.

Figure 3:
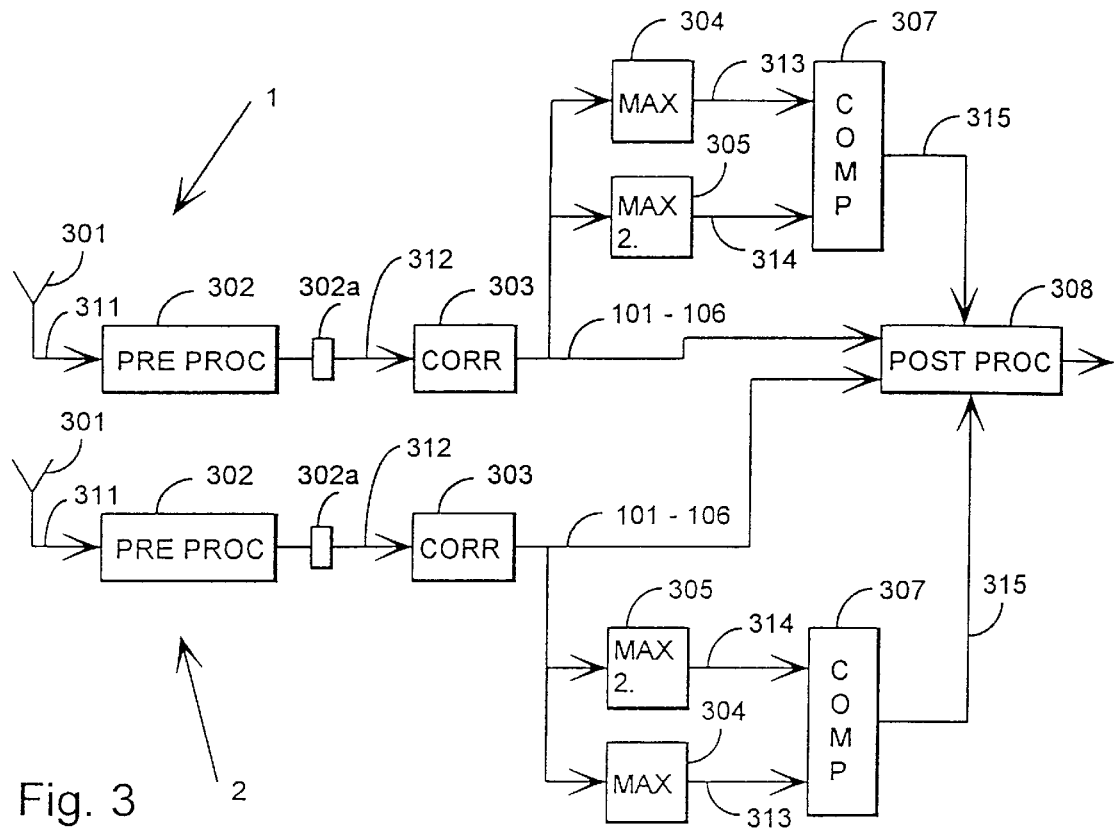
FIG. 3 shows the essential parts of a receiver according to the invention.

In the following, the receiver according to the invention is described, in which the signal quality estimate is formed. The receiver of FIG. 3 comprises two diversity branches 1 and 2. However, the solution of the invention does not restrict the number of the diversity branches, and it is adequate from the point of view of the receiver that it employs one of the diversity branches 1 and 2, whereby diversity combining will naturally not be required. Both of the branches 1 and 2 comprise an antenna 301, a signal preprocessing means 302, a spreading code means 302*a*, a correlator 303, a means 304 for determining the maximum correlation value of the correlation vector, a means 305 for determining the second highest correlation value of the correlation vector, a comparison means 307 and a signal post-processing means 308. The signal preprocessing means comprise e.g. radio frequency parts, in which the signal is converted to intermediate frequency, and a conversion section in which the signal is A/D converted. The preprocessing means 302 further comprises a spreading code means 302*a* by means of which the pseudo-random noise of the received signal is cancelled. The signal is in such a case multiplied by a specific spreading code so that it becomes a narrowband signal which may e.g. be Walsh-Hadamard transformed, and by means of which the information transmitted can be detected. The signal post-processing means 308 comprise e.g. a diversity combining means, deinterleaving means and a Viterbi detector. The signal 311 is received at the antenna 301, from which it proceeds to the preprocessing means 302. From the output signal 312 provided by the preprocessing means, the correlator 303 forms in each branch a correlation vectors 101–106 which proceeds further to the post-processing means 308. The correlation vectors 101–106 also proceed to the means 304 which determines the highest value of the correlation vector. The correlation vectors 101–106 also proceed to the means 305 which determines the second highest value of the correlation vector. Both the highest value 313 and the second highest value 314 of the correlation vector proceed to the comparison means 307 according to the invention, in which comparing the highest 313 and the second highest 314 value typically takes place by calculating their difference or relation, whereby the output of the comparison means 307 at each diversity branch is provided by an estimate 315 representing the quality of the signal. The means 307 is arranged to form the signal quality estimate 315 from several correlation vectors 101–106, typically those of one time-slot, the estimate 315 consequently corresponding to the estimate formed by averaging from several correlation vectors 101–106. By means of the estimate 315, the signals of the different branches 1 and 2 may advantageously be combined as in prior art in the diversity combining means of the post-processing means 308.

Figure 4:
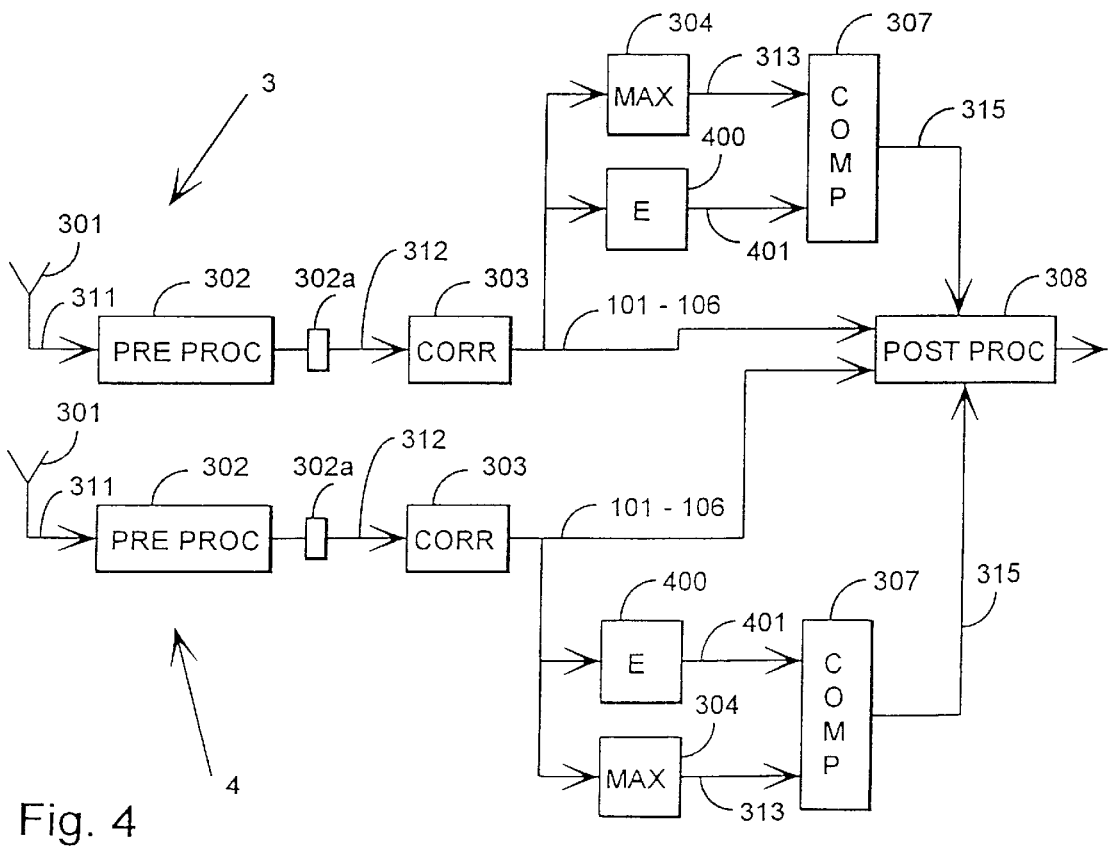
FIG. 4 shows the essential parts of a receiver according to the invention.

In the following, a description will be given of a second receiver according to the invention. The receiver of FIG. 4 comprises two diversity branches 3 and 4. However, the solution of the invention does not restrict the number of the diversity branches. Both of the branches 3 and 4 comprise an antenna 301, a signal preprocessing means 302, a spreading code means 302a, a correlator 303, a means 304 for determining the maximum correlation value of the correlation vector, a means 305 for averaging one or more correlation values, except the highest, a comparison means 307 and a signal post-processing means 308. The signal preprocessing means 302 comprises e.g. radio frequency parts, in which the signal is converted to intermediate frequency, and a conversion section in which the signal is A/D converted. The spreading code means 302a comprised in the preprocessing means 302 is arranged to function so that the spreading code is the same as that of the signal received from the transmission, whereby the signal will become a narrowband signal and consequently the highest correlation value 313 of the correlation vector 101–106, formed by the correlator 303, represents the information transmitted. The signal post-processing means 308 comprise e.g. a diversity combining means, deinterleaving means and a Viterbi detector. The signal is received at the antenna 301, from which the signal 211 proceeds to the preprocessing means 302. From the output signal 312 provided by the preprocessing means, the correlator 303 forms in each branch a correlation vector 101–106 which proceeds further to the post-processing means 308. The correlation vectors 101–106 also proceed to the means 304 which determines the highest value of the correlation vector. The correlation vectors 101–106 also proceed to the means 400 which forms the mean value of all but the highest correlation value of the correlation vector. Both the highest value 313 and the formed mean value 401 proceed to the comparison means 307 which forms a signal quality estimate 315 typically by calculating the difference or relation between the highest value 313 and the mean value 401. The means 307 is arranged to form the signal quality estimate 315 from several correlation vectors 101–106, the estimate 315 consequently corresponding to the estimate formed by averaging from several correlation vectors 101–106. By means of the estimate 315, the signals of the different branches 3 and 4 may advantageously be combined as in prior art in the diversity combining means of the post-processing means 308. All the means 301–308 comprised in the receiver are prior art electronic components or devices which process an analog or digital signal. Particularly the means 304, 305, 307 and 400 which are significant for the invention are advantageously implemented by software by means of a processor, or they are process-controlled electronic components. More specifically, these means may be implemented by a digital signal processor (i.e. DSP) or an ASIC circuit.

Estimating noise quality

In the following, the method according to the invention for estimating noise quality is described in greater detail with reference to FIGS. 1 and 2. The wideband signal is multiplied in the receiver by a pseudo-noise spreading code which is not in use in the reception area of the receiver. Thus, the received signal will not be transformed into a narrowband signal, and the correlation vector, advantageously formed by a Walsh-Hadamard transform, does not present a high correlation value relating to the information of the transmitting party, but all the correlation values represent noise. According to the method according to the invention, the estimate representing noise quality is formed in the same manner as the estimate representing signal quality by comparing one or more correlation values of a single correlation vector 101–106, with the exception of the highest value thereof, to the highest value of the correlation vectors 101–106 and advantageously by averaging the comparison result of each correlation vectors 101–106 in relation to the number of correlation vectors employed in the comparison. In FIG. 2, all the values of the striped correlation vector represent noise because the spreading code used at the reception is one not used in the transmission at the receiver reception area. The highest correlation value caused by noise is therefore C36. Regarding a single correlation vector 101–106, all other values C1–C35 and C37–C64, i.e. all but the highest, may be combined e.g. by summing or by calculating the mean value which is compared to the highest value C36 when forming the estimate. A second alternative is to choose a single value which is compared to the highest value. Rapid fluctuations of the estimate may be reduced and the result be made more accurate by taking into account estimation results of several correlation vectors and by calculating an estimate from the results as a mean value.

The highest correlation value of the correlation vectors 101–106 may advantageously be compared to the second highest correlation value of the same correlation vector. In FIG. 2, the second highest correlation value of the striped correlation vector is C23. As both the highest C36 and the second highest correlation value C23 represent noise, by comparing the highest correlation value to the second highest correlation value a threshold will be obtained whose exceeding as to the difference between the highest and the second highest correlation value means that there is a signal in the channel. Comparing the second highest correlation value to the highest correlation value advantageously takes place by dividing said values by each other, whereby the dividing produces an estimate representing the noise quality. In a second preferred embodiment of the invention, the comparison takes place by calculating the difference between the highest and the second highest correlation value, the difference also representing an estimate for the noise quality. A mean value for the estimate for a specific time interval or at a specific number of correlation vectors is more advantageous than a noise quality estimate relating to one correlation vector. For this reason, it is advantageous to average the forming of the estimate as a difference and division result between the highest and the second highest correlation value in one time-slot or, if required, in more than one time-slots, provided that there are no significant changes in the channel during the averaging process.

In the preferred embodiment of the invention, the correlation-vector-specific estimate representing the noise quality is formed by dividing the highest correlation value C36 of the correlation vectors 101–106 by the mean value of the other correlation values C1–C64. If the averaging process utilizes only a few correlation values, and particularly if only one correlation value is used, the highest value C36 may be omitted from the averaging. A second alternative is to calculate the difference between the highest correlation value and the mean value of the other correlation values.

Instead of the mean value, a median or some other linear or non-linear function may be used which weights the result to be between the highest and lowest value used in the calculation.

In case signal transmission takes place in a cellular radio system in time-slots of the CDMA technique, all correlation vectors 101–106 comprised by the time-slots are advantageously used. The exemplary CDMA time-slot of the cellular radio system comprises six modulation symbols which form six correlation vectors per a time-slot. Consequently, in CDMA technique, the estimate representing signal quality in accordance with the invention is formed by averaging, from six correlation-vector-specific estimates, an estimate representing noise quality over the entire time-slot. In this case, too, averaging may be replaced by a median or some other averaging function.

In the following, the receiver according to the invention is examined, in which the signal quality estimate is formed. The receiver illustrated in FIGS. 3 and 4 functions as an estimator of noise quality and signal quality as well. The only difference is in the receiver preprocessing means 302, the part 302*a* therein being arranged not to synchronize with any of the spreading codes of signals present in the reception area of the receiver, whereby the correlation values, formed by the correlator 303 of the receiver, in the correlation vector 101–106 represent only noise. This results in that the output of the comparison means 307 in each diversity branch is provided by the noise quality estimate 315 according to the inventive method.

A noise estimate is advantageously utilized in a diversity receiver in examining the presence of a signal on the diversity branches. On the basis of the estimate it will also be known when a signal exceeds a correlation value fluctuation caused by mere noise. This may be utilized in. e.g. RAKE allocation.

In this inventive solution, too, all the means 301–308 comprised in the receiver are prior art electronic components or devices which process an analog or digital signal. Particularly the means 304, 305, 307 and 400 which are significant for the invention are advantageously implemented by software by means of a processor, or they are process-controlled electronic components. More specifically, these means may be implemented by a digital signal processor (i.e. DSP) or an ASIC circuit.

Although the invention is in the above described with reference to the example in the accompanying drawings, it is obvious that the invention is not restricted thereto but may be modified in many ways within the inventive idea set forth in the attached claims.

What is claimed is:

1. A method for estimating signal quality, the method being used in a spread spectrum radio system having several transmitters and receivers, and in which each transmitted signal is pseudonoise-coded by a separate spreading code into a wideband form and the signal being converted into modulation symbols having a vector form, said modulation symbols being submatrices of a substantially orthogonal known transform matrix, said submatrices being chosen on the basis of a combination of bits to be transmitted, the signal being multiplied by a spreading code in the receiver in which a correlation is formed between the received modulation symbols and the known transform matrix, the correlation forming correlation vectors which comprise correlation values and by means of which the signal is detected, wherein, when multiplying the received signal by a specific spreading code, an estimate representing the signal quality is formed by comparing the mean value of one or more correlation values of the correlation vector to the highest value of the correlation vector, in which the mean value of one or more correlation values comprises all other correlation values but the highest correlation value.

2. A method for estimating noise quality, the method being used in a spread spectrum radio system having several transmitters and receivers, and in which each transmitted signal is pseudonoise-coded by a separate spreading code into a wideband form and the signal being converted into modulation symbols having a vector form, said modulation symbols being submatrices of a substantially orthogonal known transform matrix, said submatrices being chosen on the basis of a combination of bits to be transmitted, the signal being multiplied by a spreading code in the receiver in which a correlation is formed between the received modulation symbols and the known transform matrix, the correlation forming correlation vectors which comprise correlation values and by means of which the signal is detected, wherein, when multiplying the received signal by a spreading code which is substantially orthogonal to the spreading codes of all the received signals, the estimate representing the noise quality is formed by comparing the mean value of one or more correlation values of the correlation vector to the highest value of the correlation vector, in which the mean value of one or more correlation values comprises all other correlation values but the highest correlation value.

3. A method as claimed in claim 2, wherein the mean value of two or more correlation values is formed by using any correlation values comprised by the correlation vector.

4. A method as claimed in claim 1 or 2, wherein the comparison takes place by comparing the second highest correlation value of the correlation vector to the highest value of the correlation vector.

5. A method as claimed in claim 1 or 2, wherein the comparison takes place by dividing the highest correlation value of the correlation vector by the mean value of all the correlation values but the highest.

6. A method as claimed in claim 5, wherein the comparison takes place by subtracting, from the highest value of the correlation vector, the mean value of all the other correlation values but the highest.

7. A method as claimed in claim 4, wherein the comparison takes place by dividing the second highest correlation value by the highest correlation value.

8. A method as claimed in claim 4, wherein the comparison takes place by subtracting the second highest correlation value from the highest correlation value.

9. A method as claimed in claim 1 or 2, wherein the estimate is formed as a mean value of several estimates of single correlation vectors.

10. A method as claimed in claim 9, wherein when signal transmission takes place in time-slots the estimate is formed as a mean value of all the correlation vector estimates comprised by at least one time-slot.

11. A method as claimed in claim 1, wherein when the receiver is a diversity receiver comprising several diversity branches, the estimate formed is used as a weighting coefficient in combining the signals of the different diversity branches.

12. A receiver of a spread spectrum radio system, the system comprising several transmitters and receivers, each transmitted signal in the system being pseudonoise coded by a separate spreading code into a wideband signal and the signal being converted into modulation symbols having a vector form, said modulation symbols being submatrices of a substantially orthogonal known transform matrix, said submatrices being chosen on the basis of a combination of bits to be transmitted, the signal being multiplied by a spreading code in the receiver which comprises a correlator for forming a correlation between the received modulation symbols and the known transform matrix, the correlation forming correlation vectors which comprise correlation values and by means of which the signal is detected, the receiver comprising:

comparison means for forming an estimate representing signal quality, the comparison means being arranged to compare the mean value of one or more correlation values of a single correlation vector, with the exception of the highest value thereof, to the highest value of the correlation vector, and arranged to operate when multiplying the signal by a specific spreading code.

13. A receiver of a spread spectrum radio system, the system comprising several transmitters and receivers, each transmitted signal in the system being pseudonoise-coded by a separate spreading code into a wideband signal and the signal being converted into modulation symbols having a vector form, said modulation symbols being submatrices of a substantially orthogonal known transform matrix, said submatrices being chosen on the basis of a combination of bits to be transmitted, the signal being multiplied by a spreading code in the receiver which comprises a correlator for forming a correlation between the received modulation symbols and the known transform matrix, the correlation forming correlation vectors which comprise correlation values and by means of which the signal is detected, the receiver comprising:

comparison means for forming an estimate representing noise quality, the comparison means being arranged to compare the mean value of one or more correlation values of a single correlation vector, with the exception of the highest value thereof, to the highest value of the correlation vector, and arranged to operate when multiplying the signal by a spreading code substantially orthogonal to the spreading codes of all the received signals.

14. A receiver as claimed in claim 12 or 13, wherein the receiver comprises a means for determining the highest correlation value of the correlation vector.

15. A receiver as claimed in claim 12 or 13, wherein the receiver comprises a means for determining the second highest correlation value of the correlation vector.

16. A receiver as claimed in claim 12 or 13, wherein the receiver comprises a means for calculating a mean value of one or more correlation values of the correlation vector, where the mean value of one or more correlation values comprises all the other correlation values but the highest correlation value.

17. A receiver as claimed in claim 12 or 13, wherein the comparison means comprised by the receiver is arranged to divide the second highest correlation value of the correlation vector by the highest value of the correlation vector.

18. A receiver as claimed in claim 12 or 13, wherein the comparison means comprised by the receiver is arranged to subtract the second highest correlation value of the correlation vector from the highest value of the correlation vector.

19. A receiver as claimed in claim 12 or 13, wherein the comparison means comprised by the receiver is arranged to divide the mean value of one or more correlation values of the correlation vector by the highest correlation value of the correlation vector.

20. A receiver as claimed in claim 12 or 13, wherein the comparison means comprised by the receiver is arranged to subtract the mean value of one or more correlation values of the correlation vector from the highest correlation value of the correlation vector.

21. A receiver as claimed in claim 16, wherein the means for calculating the mean value of the correlation values is arranged to form a mean value from any two or more correlation values of the correlation vector.

22. A receiver as claimed in claim 12 or 13, wherein when the transmission comprises time-slots the comparison means is arranged to use all the correlation vectors of at least one time-slot.

23. A receiver as claimed in claim 12, wherein the receiver is a diversity receiver which is arranged to use the estimate formed as a weighting coefficient in combining the diversity branch signals.

\* \* \* \* \*